March 5, 1963
L. E. RUSSELL
3,079,657
FASTENING DEVICE
Filed Sept. 28, 1959
2 Sheets-Sheet 1
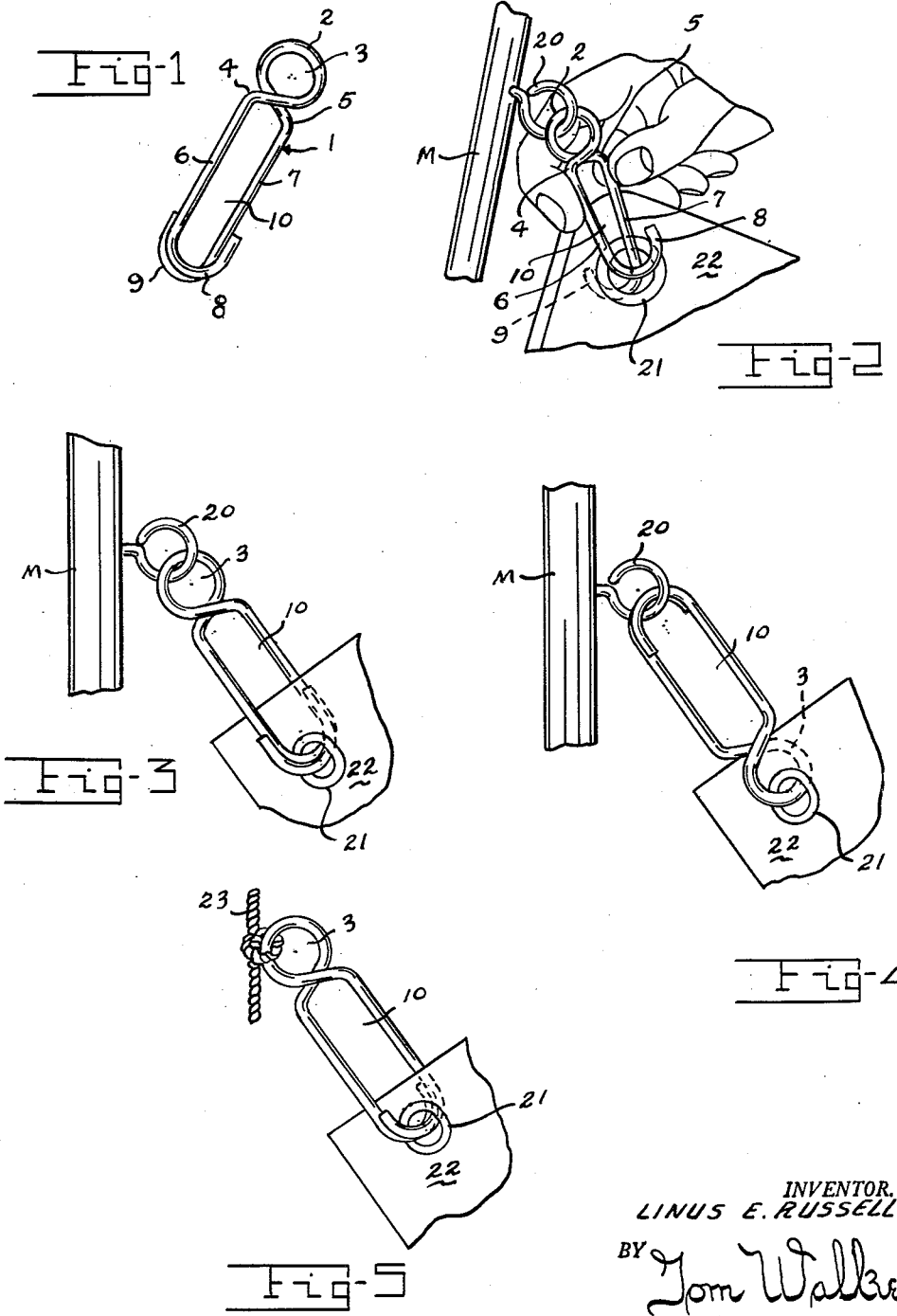
INVENTOR.
LINUS E. RUSSELL
BY Tom Walker
ATTORNEY

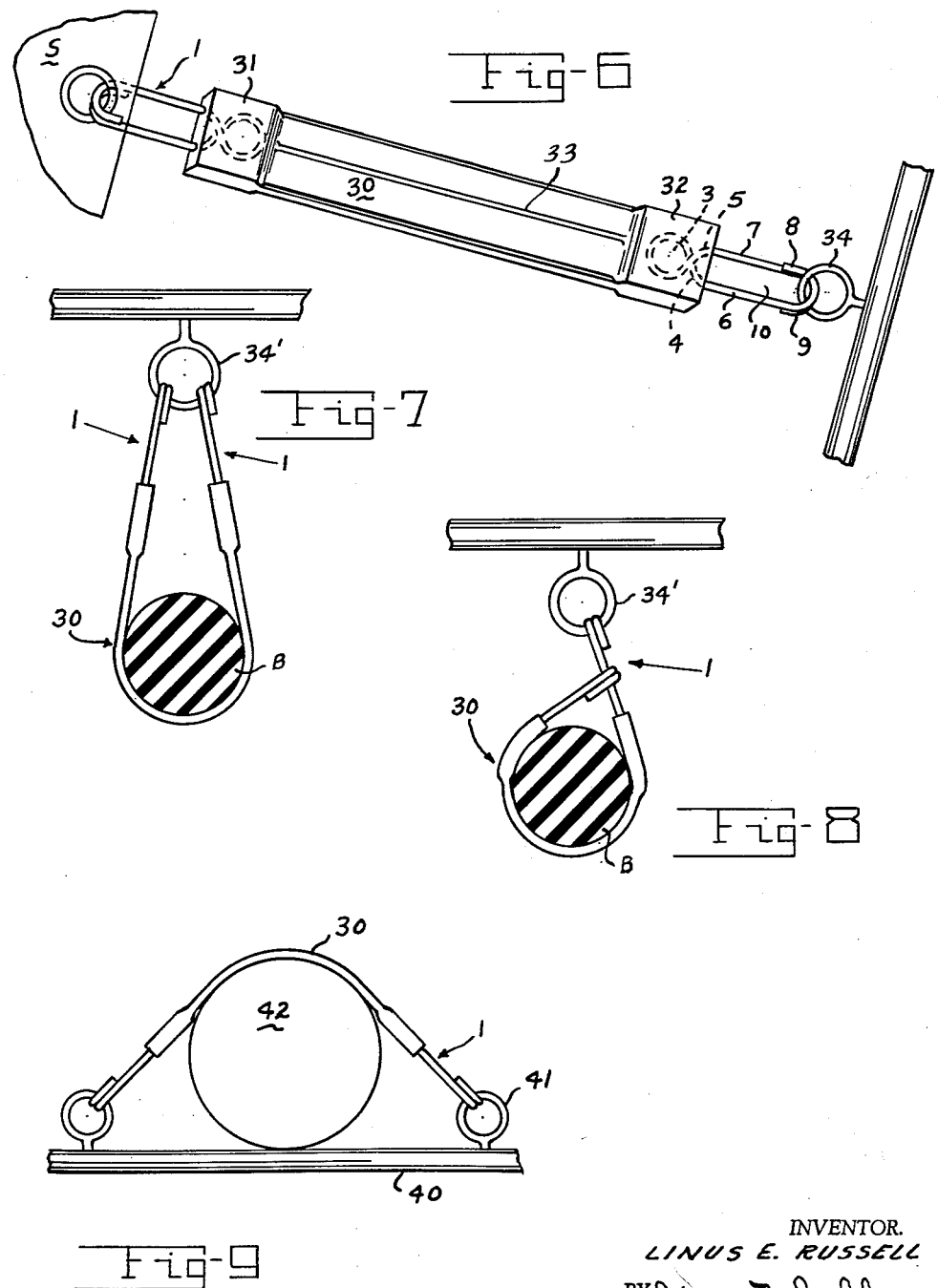

United States Patent Office 3,079,657
Patented Mar. 5, 1963

3,079,657
FASTENING DEVICE
Linus E. Russell, Springfield, Ohio, assignor to Peters & Russell, Inc., Springfield, Ohio, a corporation of Ohio
Filed Sept. 28, 1959, Ser. No. 842,728
3 Claims. (Cl. 24—73)

This invention relates to fasteners and more particularly to improvements in tie down and suspension apparatus. It provides devices highly advantageous for marine use and will be described with reference thereto since this art is quite demanding with respect to features of security and simplicity in fastening devices. However, it will be obvious therefrom that the application of the invention is not so limited and such is not intended.

Many devices have been previously developed for similar purposes, the majority of which however have limited application. A great number are either difficult to manipulate or apply while others lack features of security. It has also proven difficult to achieve an effective, versatile tie down and suspension device at a low unit cost.

The present invention provides a high quality, low cost tie down and suspension apparatus affording maximum security in use. A preferred embodiment provides a resilient strap unit incorporating novel clip connector means capable of quick and easy application for safe and secure fastening of sails, canvas and the like under a required tension. The same embodiment can be applied to effect a simple and secure shock absorbing suspension of boat bumpers, for example.

A prime feature of the invention is the novel connector or hanger clip provided in conjunction with the aforementioned strap unit which per se offers a high degree of security and adaptability in use. This clip may be easily manipulated and efficiently employed under the most demanding conditions. It is particularly advantageous due to its character of reversibility in application.

A primary object of the invention is to provide tie down and suspension apparatus which is economical to fabricate, more efficient and satisfactory in use, adaptable to a wide variety of applications and unlikely to malfunction.

A further object of the invention is to provide an improved tie down device affording a force accommodating connector offering maximum security and safety in use.

Another object of the invention is to provide a simplified shock accommodating suspension device particularly advantageous for marine use.

An additional object of the invention is to provide a versatile strap connector device.

Another object of the invention is to provide improved clip connector means which cannot be opened inadvertently.

A further object of the invention is to provide improved clip suspension means.

Another object of the invention is to provide a novel clip connector which can be easily manipulated and offers maximum security in use.

An additional object of the invention is to provide a novel clip connector which can be reversibly employed.

A further object of the invention is to provide a fastening device possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompany drawings, or their equivalents.

Referring to the accompanying drawing wherein is shown one but obviously not necessarily the only form of embodiment of the invention, FIG. 1 shows a perspective view of a clip connector in accordance with the invention;

FIG. 2 shows the clip of FIG. 1 being applied per se to connect a flag to a mast;

FIG. 3 is a fragmentary view of the flag of FIG. 2 secured to a mast by the invention clip unit;

FIG. 4 is a view similar to FIG. 3 showing the clip being used in a reversed condition;

FIG. 5 illustrates another way that the clip of FIG. 1 may be employed;

FIG. 6 shows an application of a preferred tie down and suspension device in accordance with the invention incorporating the clip of FIG. 1;

FIG. 7 is a cross sectional view illustrating the device of FIG. 6 as employed to suspend a boat bumper;

FIG. 8 is a view similar to FIG. 7 showing another manner of using the device of FIG. 6 as a suspension unit; and FIG. 9 is a schematic illustration of the device of FIG. 6 as employed to tie down a Thermos jug in a boat or the like.

Like parts are indicated by similar characters of reference throughout the several views.

To facilitate a clear presentation of the features of novelty embodied in the invention, the improved clip connector device and various applications thereof will be first described. The improvements and advantages of the tie down and suspension apparatus provided by the invention will thereby become readily apparent.

As shown in the drawings, the clip provided by the invention is formed from a single length of stainless wire 1. The wire 1 is symmetrically curved from its center 2 and crossed at points substantially equi-distant therefrom to form a generally circular loop 3. The portions of the wire 1 to either side of its center 2 are extended from the points where the cross to points 4 and 5, respectively to either side of a line through the center of loop 3 and their point of intersection and substantially equally spaced therefrom. From the points 4 and 5 the respective end portions of the wire are diverted to provide sections 6 and 7, respectively, running generally parallel and in relatively superimposed planes. The extremities of the wire 1 are oppositely bent relative to the sections 6 and 7 to respectively form uniform hooks 8 and 9. The hook extremities 8 and 9 are superimposed to complete an elongated loop 10 connected to extend generally radially from the loop 3.

The clip thus formed is of a resilient nature. The wire sections 6 and 7 and their respective hook extremities are biased to lie in immediately superimposed planes with the sections 6 and 7 generally parallel and the hook extremities in tightly overlying relation to one another.

As may be seen with reference to FIG. 2 of the drawings, application of pressure through the thumb and forefinger to move wire sections 6 and 7 towards each other causes the lop 10 to contract and the respective hooks 8 and 9 to project laterally of the contracted loop. This enables easy insertion of one of the hook extremities, 9 for example, through screw eye 20 attached to a mast M. Further movement of the clip causes the eye 20 to pass between overlying portions of the hooks into the loop 10. The hook extremities snap toward each other as the eye enters the loop. The clip is then moved to thread the eye over wire section 7 and between the crossed portions of the wire into the loop 3, the crossed portions snapping together as the eye passes. After the clip is engaged to the eye 20 it may be similarly manipulated, as shown, to thread the hook extremity 9 through the grommet 21 defining an aperture in a flag 22 and the grommet moved into hook 10 between the overlying portions of the hooks 8 and 9 as previously described. The flag is simply and positively secured thereby. It won't blow away or work loose due to clip failure.

As seen in FIG. 3 of the drawings, the screw eye on the mast M is retained in the loop 3, and restrained from displacement by the crossed over portions of the wire 1 which are firmly biased to each other by the clip configuration. Also, the flag poriton anchored in loop 10 is contained to one end by the crossed over portions of the wire and to the other end by the immediately superimposed hook extremities 8 and 9 which are firmly biased to each other. It is noted that the circular loop 3 provides a rolling conection while the elongated loop provides a substantial slip accommodating connection. This clip construction insures a clip fastener which cannot be readily disconnected and one which minimizes possibility of damage to devices secured thereby, even under maximum stress conditions. As is obvious from FIG. 4 of the drawings, the clip can be used in a reversed condition where the situation makes it preferable to do so.

Due to the tight bias on the superposed loop closure portions, the clip cannot be inadvertently opened. However, the clip may be easily manipulated by proper application of the thumb and forefinger to exert pressure on the clip sections 6 and 7 to contract the loop 10 and thereby project the hook extremities 8 and 9 for removal of an article.

The clip may also be advantageously used in instances where a device is to be suspended from a rod or cable. Reference is made to FIG. 5 of the drawings which shows a rope or cable 23 threaded through the loop 3 and secured thereto for suspension of the clip while canvas is secured in loop 10 in the manner previously described. A simple and most effective suspension of canvas can be obtained thereby. Even severe wind or shock will not disengage the clip or the material secured by the clip.

The adaptibility as well as maximum security provided by a clip in accordance with the invention is believed obvious. Its simplicity makes it economical to fabricate and easy to use.

A strap tie down and suspension unit as provided by the invention is shown in FIGS. 6–9 of the drawings. It is illustrated in a preferred form incorporating the clip device provided by the wire 1 described with reference to FIGS. 1–5. This unit includes a relatively thin elongated strap element 30 which is relatively thickened at its respective ends 31 and 32. The strap 30 is preferably formed of rubber or similar material to provide it with strength, flexibility and resilience. It is molded to have laterally spaced reinforcing ribs 33 extending longitudinally at its lateral extremities and intermediately thereof.

A clip device as previously described is integrated in each end of the strap 30. The clip at either end of the strap has a portion molded therein which consists of its loop 3 and the crossed over portions of the wire forming the loop 3 to the points 4 and 5 and slightly beyond so as to include portions of the wire sections 6 and 7. Thus, the major portions of the sections 6 and 7 and their connected hook extremities 8 and 9 project generally axially from the strap extremities in adjacent superposed planes. While the loops 3 are contained within the relatively thickened ends 31 and 32 of the strap, the resiliency of the strap material permits the flexing thereof previously described. Accordingly, on applying the thumb and forefinger to wire sections 6 and 7 projecting from an end of the strap the loop 10 formed thereby can be contracted and the hooks 8 and 9 projected. This enables an ease and speed of connection of the strap which is readily obvious. Also, once there is an engagement of apparatus in the loop portions 10 projected from the strap, there is very little danger of inadvertent disengagement of the strap.

The strap unit is shown in FIG. 6 of the drawings connected between a sail S and a grounded screw eye 34 to provide a resilient tensioned tie down of a portion of a sail. The strap as formed has substantial strength and will tend to maintain a status quo of the sail. Its resiliency and flexibility will accommodate substantial stress with little danger of the strap or the sail being damaged in the process. The advantages of the integrated clip connector means which offer features of maximum security and adaptability in the tie down apparatus have been described in detail and need not be repeated. The strap unit thereby provides features of strength, ease of application and removal, and maximum safety, rendering it particularly advantageous for marine applications where the stress and strain to be applied are variable and uncertain in degree.

FIG. 7 of the drawings shows the strap unit of FIG. 6 as a suspension device for a boat bumper which is naturally subject to high impact forces. As shown, the bumper B may be cradled by a plurality of longitudinally spaced straps 30', the respective clip units at the extremities being engaged through a common screw eye 34' for example. As a suspension unit, the features which make the device highly desirable as a tie down unit serve equally as well. Impact shock on the bumper will be readily accommodated by the resilient flexible straps and there will be little danger of failure of the connector clip elements which are bonded and integrated to the straps.

FIG. 8 shows an application similar to that shown in FIG. 7. However, in this instance only one of the protruding clip portions in each strap is connected to the screw eye while the projected clip portion at the other end is interengaged therewith in a manner believed obvious. This provides a tighter cradle of the bumper in instances where this is desirable.

FIG. 9 of the drawing shows yet another application of the invention strap unit in the marine art. The showing here is of a shelf 40 having spaced screw eyes 41 projected therefrom to either side of a water jug 42. A strap unit as in FIG. 6 is connected between the screw eyes stretching over the jug. The connection of the loop 10 of the clip portions of unit places the strap therebetween under tension to firmly hold the jug in position. The jug will be maintained in this position irrespective of tossing of the boat in which it is placed. The simplicity and safety in use of the devices of the invention as well as the ease of their application and removal provides definite advantages in the art. The devices offer high degree of versatility adapting them for both the simplest and the most complex of applications. Also, the simplicity of the devices enables their production at a relatively low cost.

It should be kept in mind that the examples as to application and embodiment of the invention are merely illustrative and not to be construed as limiting since the present invention has utility and application in many fields other than as a marine item.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described any invention, I claim:

1. Tie down and suspension apparatus comprising, a resilient flexible strap-like member, spaced loop elements resiliently anchored to said strap member, at least one of said loop elements consisting of a single wire-like element uniformly curved from a point adjacent its center to cross and extend in generally parallel relation, the central and crossed over portions of said one loop element being imbedded in the body of said member and the generally parallel portions projected therefrom, the projected extremities of said parallel portions being curved and immediately superposed to define a tight elongated loop.

2. Tie down and suspension apparatus comprising, a resilient flexible body including a pair of hook means projected from each of opposite portions thereof, each pair of hook means comprising hooks lying in immediately adjacent planes, each pair of hook means having means so connected in said body, including crossed over portions resiliently anchored therein, to resist relative movement of said hooks away from each other and accommodate movement towards each other to provide access therebetween.

3. Tie down apparatus comprising a resilient flexible body member having a loop resiliently anchored thereto, said loop consisting of a single wire-like element substantially uniformly curved from a point adjacent its center to have its end portions cross and extend in generally parallel relation, the central and crossed over portions of said loop being imbedded in the body of said member and the generally parallel portions projected therefrom and formed in a manner to provide a loop with said body member.

References Cited in the file of this patent

UNITED STATES PATENTS

| | | |
|---|---|---|
| 159,403 | Foster | Feb. 2, 1875 |
| 546,420 | Dreyfus | Sept. 17, 1895 |
| 1,412,919 | Campbell | Apr. 18, 1922 |
| 1,542,362 | Blakely | June 16, 1925 |
| 1,781,708 | Sheldrake | Nov. 18, 1930 |
| 1,804,725 | Walker | May 21, 1937 |
| 2,209,475 | Rawling | July 30, 1940 |
| 2,372,967 | Martin | Apr. 3, 1945 |
| 2,461,693 | McAloon | Feb. 15, 1949 |
| 2,484,449 | Fetterman | Oct. 11, 1949 |
| 2,704,071 | Becker | Mar. 15, 1955 |
| 2,727,399 | Hjort | Dec. 20, 1955 |
| 2,840,898 | Yeo | July 1, 1958 |
| 3,009,220 | Fein | Nov. 21, 1961 |

FOREIGN PATENTS

| | | |
|---|---|---|
| 825,652 | France | Dec. 16, 1937 |
| 1,064,942 | France | Dec. 30, 1953 |
| 1,037,457 | France | Apr. 29, 1953 |